United States Patent [19]
Peter et al.

[11] 3,935,679
[45] Feb. 3, 1976

[54] GRINDING FIXTURE

[75] Inventors: Bruno E. Peter, Milwaukee, Wis.; Reinhardt R. Deetken, Holly, Mich.

[73] Assignee: Grede Foundries, Inc., Milwaukee, Wis.

[22] Filed: July 22, 1974

[21] Appl. No.: 490,344

[52] U.S. Cl. .................................. 51/239; 269/296
[51] Int. Cl.² ........................................ B24B 41/06
[58] Field of Search... 51/238 R, 238 S, 239, 240 R, 51/240 T, 240 A, 240 GB; 269/296, 311, 310

[56] References Cited
UNITED STATES PATENTS

| | | | |
|---|---|---|---|
| 1,125,566 | 1/1915 | Lang | 51/240 A UX |
| 1,312,306 | 8/1919 | Campbell | 269/296 |
| 2,086,024 | 7/1937 | Flygare | 51/238 S |
| 2,696,764 | 12/1954 | Sternbergh | 269/310 |
| 2,828,589 | 4/1958 | Hercik | 51/240 R |
| 3,181,858 | 5/1965 | Daniels | 269/296 |
| 3,274,867 | 9/1966 | Sell | 51/238 S X |
| 3,347,543 | 10/1967 | Zak | 269/296 |
| 3,537,701 | 11/1970 | Claycomb | 269/310 UX |

FOREIGN PATENTS OR APPLICATIONS

| | | | |
|---|---|---|---|
| 770,770 | 3/1957 | United Kingdom | 269/296 |
| 120,214 | 4/1970 | Norway | 269/287 |

*Primary Examiner*—Harold D. Whitehead
*Attorney, Agent, or Firm*—Andrus, Sceales, Starke & Sawall

[57] ABSTRACT

A grinding fixture for grinding cylinder head castings. The fixture includes a row of aligning pins that extend upwardly from the fixture and the lower ends of each pair of adjacent pins are engaged with the ends of a balancing plate which is fulcrumed within the fixture. The outer projecting ends of the pins are received within the combustion chambers in the cylinder head casting, and the aligning pins and balancing plates tend to level the casting in a longitudinal direction. The lower surface of the casting is adapted to engage three targeting pins, and the lower ends of the targeting pins are engaged with a pivotable balancing plate to thereby level the casting in a transverse direction. Spring loaded locking pins extend upwardly from the fixture and engage the bottom surface of the casting. When the casting is leveled through use of the aligning pins and targeting pins, the locking pins are locked to hold the casting rigidly in place for the grinding operation.

15 Claims, 6 Drawing Figures

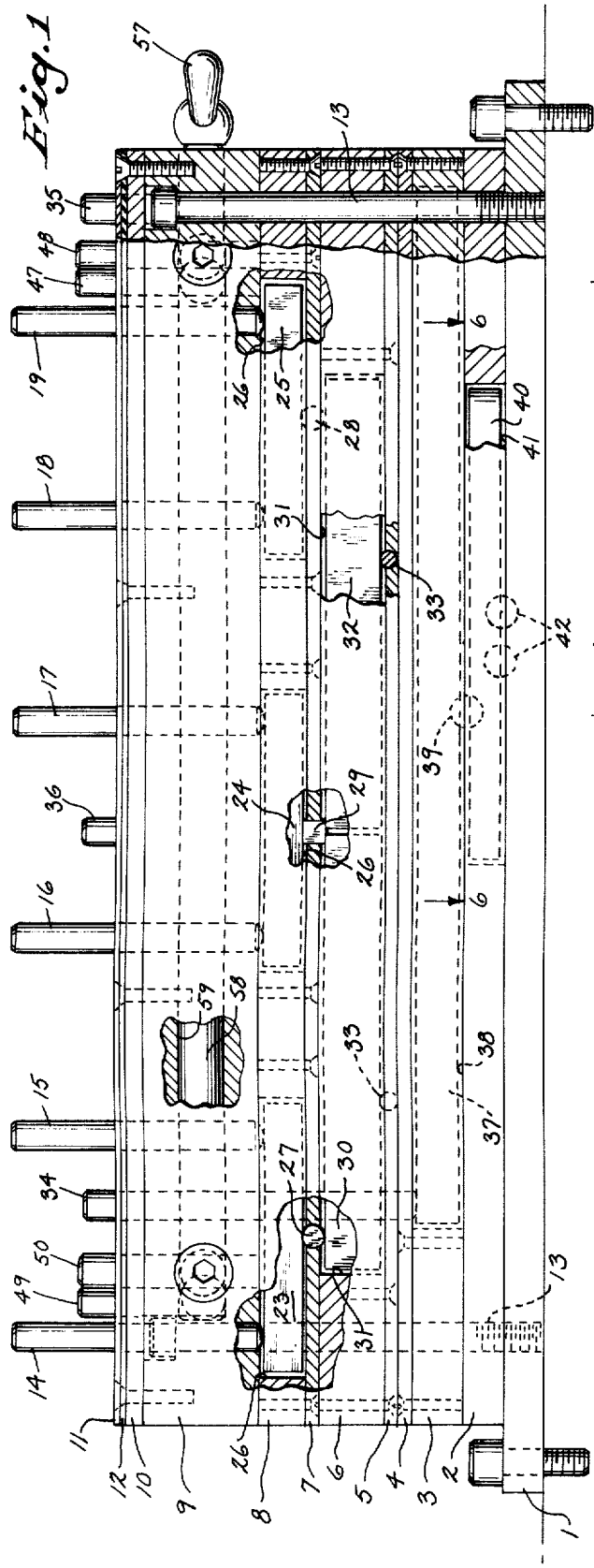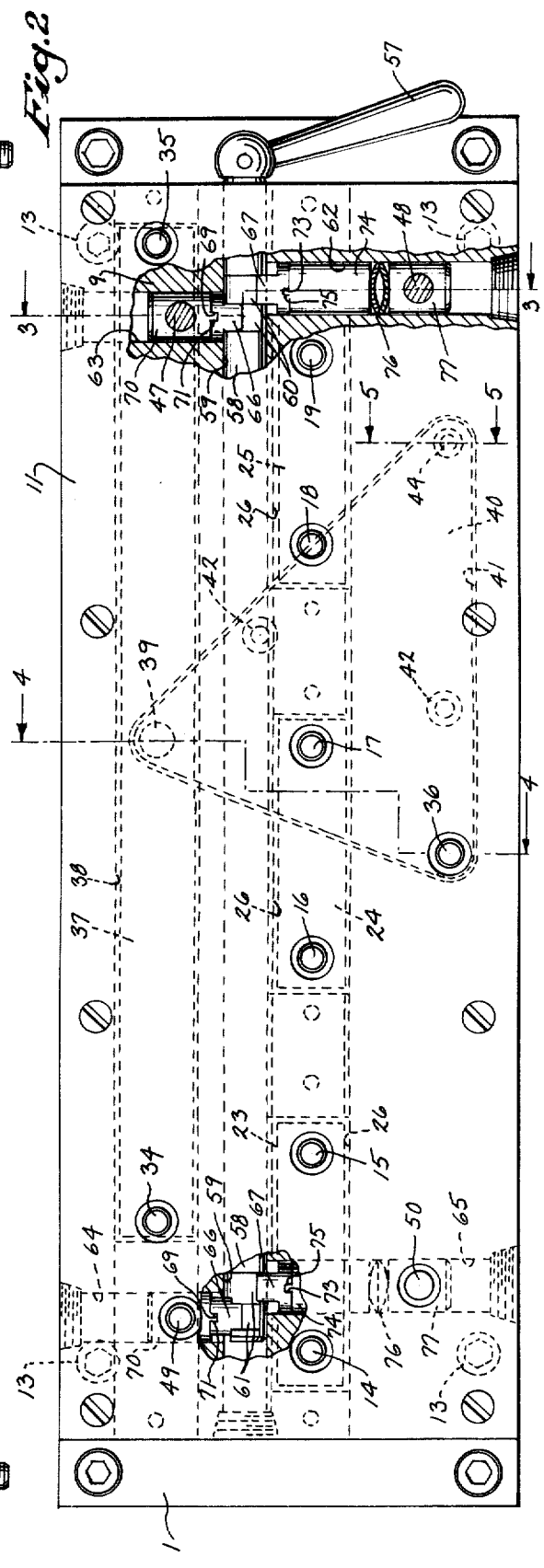

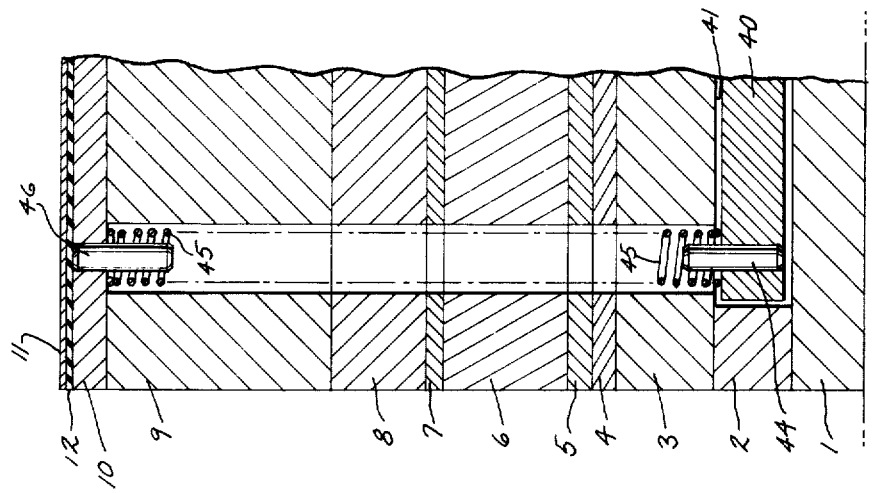

GRINDING FIXTURE

BACKGROUND OF THE INVENTION

Cylinder head castings to be used in internal combustion engines contain 4 to 8 cavities or combustion chambers, and the lower surface of the head casting is adapted to be joined to the cylinder block of the engine. After the casting operation, the upper surface of the head casting, as well as the sides and ends of the castings, is ground to remove parting lines, flash, flow pins, gating, etc., from the casting. In the past, the practice has been to manually gring away the projecting flash and parting lines, while in the case of flow pins, the pins were manually knocked off by hammers and then ground down manually.

While automatic grinding of the cylinder head castings is desirable, no fixture or jig has been developed in the past which would properly level the casting.

An automatic grinding machine includes one or more grinding wheels which operate in a fixed plane or position for a given size casting. If the casting is not precisely level when it is passed through the grinding machine, vaaious portions of the casting may be ground too deeply, while other portions may be ground too lightly so that the casting irregularities, i.e., flash, parting lines, gating, etc., will not be completely removed. As all the outer surfaces contain casting irregularities, the outer surfaces cannot be used as reference planes for the grinding operation, and the casting cannot be precisely leveled by merely resting it on one of its outer surfaces. Because of these problems in leveling the casting in both a longitudinal and transverse direction, automatic grinding has not been successfully applied to cylinder head castings.

Summary of the Invention

The invention relates to a grinding fixture for the automatic grinding of cylinder head castings for internal combustion engines. The fixture is provided with a row of aligning pins which project upwardly from the upper surface of the fixture and the lower ends of each pair of adjacent pins engage the ends of a balancing plate. Each balancing plate is fulcrumed on a larger balancing plate which in turn is fulcrumed or pivoted to the interior of the fixture.

The upper projecting ends of the aligning pins are adapted to be received within the combustion chambers in the head casting and engage the bottoms of the chambers which serve as a reference plane for leveling. Any out of tolerance or misalignment of the bottoms of the chambers will be compensated for by slight tilting of the balancing plates.

In addition to the aligning pins, the lower surface of the casting is adapted to engage three targeting pins. The lower ends of two of the targeting pins engage the ends of a balancing plate which is fulcrumed on a generally triangular, pivotable plate, while the third targeting pin engages a corner of the triangular plate. The targeting pins act to level the casting in a transverse direction. Thus, through the action of the aligning pins and the targeting pins, the upper surface of the casting will be substantially horizontal so that it can be properly ground by the automatic grinding equipment.

To secure the casting in the level condition for grinding, a series of spring loaded locking pins are utilized. The locking pins extend upwardly from the upper surface of the fixture and are adapted to be engaged by the lower surface of the casting as the casting is placed on the fixture. The locking pins are spring loaded upwardly and the weight of the casting will depress the locking pins against the force of the springs. When the casting is leveled by virtue of the aligning pins and the targeting pins, the locking pins are moved to the locked position through the use of an operating handle to thereby secure the casting with respect to the fixture for the grinding operation.

With the casting locked to the fixture, the fixture is then moved by a hydraulic cylinder unit through the grinding mechanism which serves to grind the upper surface, as well as the side surfaces of the casting. The end surfaces of the casting can either be ground manually or the casting can be passed through a similar grinding mechanism for grinding of the end surfaces.

The grinding fixture of the invention provides a balancing mechanism for automatically leveling the cylinder head casting for the grinding operation with the bottom surfaces of the combustion chambers being used as the leveling reference. After the balancing mechanism has properly leveled the casting, the locking pins are moved to the locked position which thereby holds the casting during the grinding operation and prevents downward or tilting movement of the casting under the force exerted by the grinding mechanism.

Other objects and advantages will appear in the course of the following description.

DESCRIPTION OF THE DRAWINGS

The drawings illustrate the best mode presently contemplated of carrying out the invention.

In the drawings:

FIG. 1 is a side elevation of the grinding fixture of the invention with parts broken away in section;

FIG. 2 is a top plan view of the fixture, with parts broken away in section;

FIG. 3 is an enlarged transverse section taken along line 3—3 of FIG. 2 and showing the casing supported on the fixture;

FIG, 5 is a section taken along line 5—5 of FIG. 2; and

Figure 6:
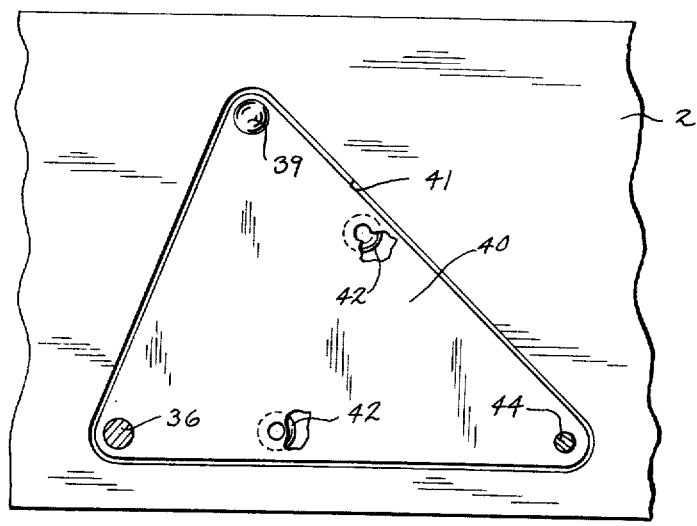

FIG. 6 is a section taken along line 6—6 of FIG. 1.

DESCRIPTION OF THE PREFERRED EMBODIMENT

The drawings illustrate a grinding fixture for supporting a cylinder head casting during automatic grinding of the casting. The fixture is adapted to level the casting and to hold the casting in the leveled condition, so that the casting can be passed through an automatic grinding mechanism to grind off parting lines, flash, flow pins and gating from the upper surface and side surfaces of the casting.

The fixture is generally rectangular in shape and is composed of a base plate 1 and a series of superimposed plates 2–11 which rest on the base plate. A resilient gasket 12 is located between the uppermost plate 11 and the plate 10 immediately beneath plate 11, and the plates 1–11 are connected together by a series of tie bolts 13 which are located at the corners of the fixture.

A row of aligning pins 14–19 are each located in aligned openings in plates 9–11 and project upwardly from the fixture. The upper ends of the pins 14–19 are adapted to engage the bottom surface 20 of combustion cavities 21 in the cylinder head casting 22. The projecting upper ends of the pins 14–19 have a length such that the lower surface of the head casting 22 will be spaced above the fixture 1 when the pins are in engagement with the surfaces 20.

The lower ends of the pins 14 and 15 bear against the ends of a balancing plate or block 23, and similarly the lower ends of pins 16 and 17 bear against the ends of a balancing plate 24, while the lower ends of pins 18 and 19 engage the ends of balancing plate 25. Balancing plates 23–25 are each located within cavities 26 formed in the plate 8. The cavities 26 can be cut from the plate 8, or alternately the plate 8 can be formed with a continuous longitudinal slot and spacers can be located within the slot to define the individual cavities 26.

The plates 23 and 25 are pivoted or fulcrummed on dowels 27 and 28, respectively, which are located within recesses in plate 7. Similarly, the central balancing plate 24 is mounted for tilting movement about a bar 29 which is positioned within a recess in the plate 7. With this construction the balancing plates 23–25 can each tilt about its fulcrum in a longitudinal direction.

As shown in FIG. 1, the dowel pin 27 projects through the slot in plate 7 and bears against the upper surface of the end of a balancing block 30 which is located within a cavity 31 in the plate 6. Similarly, the dowel 28 extends through the slot in plate 7 and engages the upper surface of the end of a second balancing plate 32 which is located within the cavity 31. Blocks 30 and 32 are positioned in an end-to-end relation and the fulcrum bar 29 bears against the abuting ends of the blocks 30 and 32. Each block 30 and 32 is fulcrumed on a dowel pin 33 which is mounted within a slot in the plate 5.

When the casting 22 is positioned on the fixture, the individual pins 14–19 will be received within the cavities 21 and engage the bottom surfaces 20. Theoretically, the surfaces 20 should lie in a common horizontal plane, but in practice, the surfaces 20 may vary slightly with an acceptable tolerance of + or ± 0.032 inch. If the surfaces 20 are not precisely on the same reference line, but within the above noted tolerance, some of the pins 14–19 will engage the surfaces 20 before other pins with the result that the tilting action of the balancing plates 23–25 and 30 and 32 will compensate for misalignment and tend to level the head casting 22.

In addition to the aligning pins 23–25, three targeting pins 34–36 extend upwardly in triangular relationship from the uppermost plate 11 of the fixture. Two of the targeting pins 34 and 35 project downwardly through aligned openings in the plates 4–11 and the lower ends of the pins 34 and 35 engage the ends of a balancing plate or bar 37 which is mounted within a cavity 38 in plate 3. The central portion of plate 37 is fulcrumed on a ball 39 which is located in a recess in one corner of a generally triangular plate 40. Plate 40, as shown in FIG. 6, is located within a cavity 41 in plate 2. Plate 40 is mounted for tilting movement on a pair of balls 42 that are mounted within mating recesses in the lower surface of plate 40 and the upper surface of plate 1.

Figure 4:
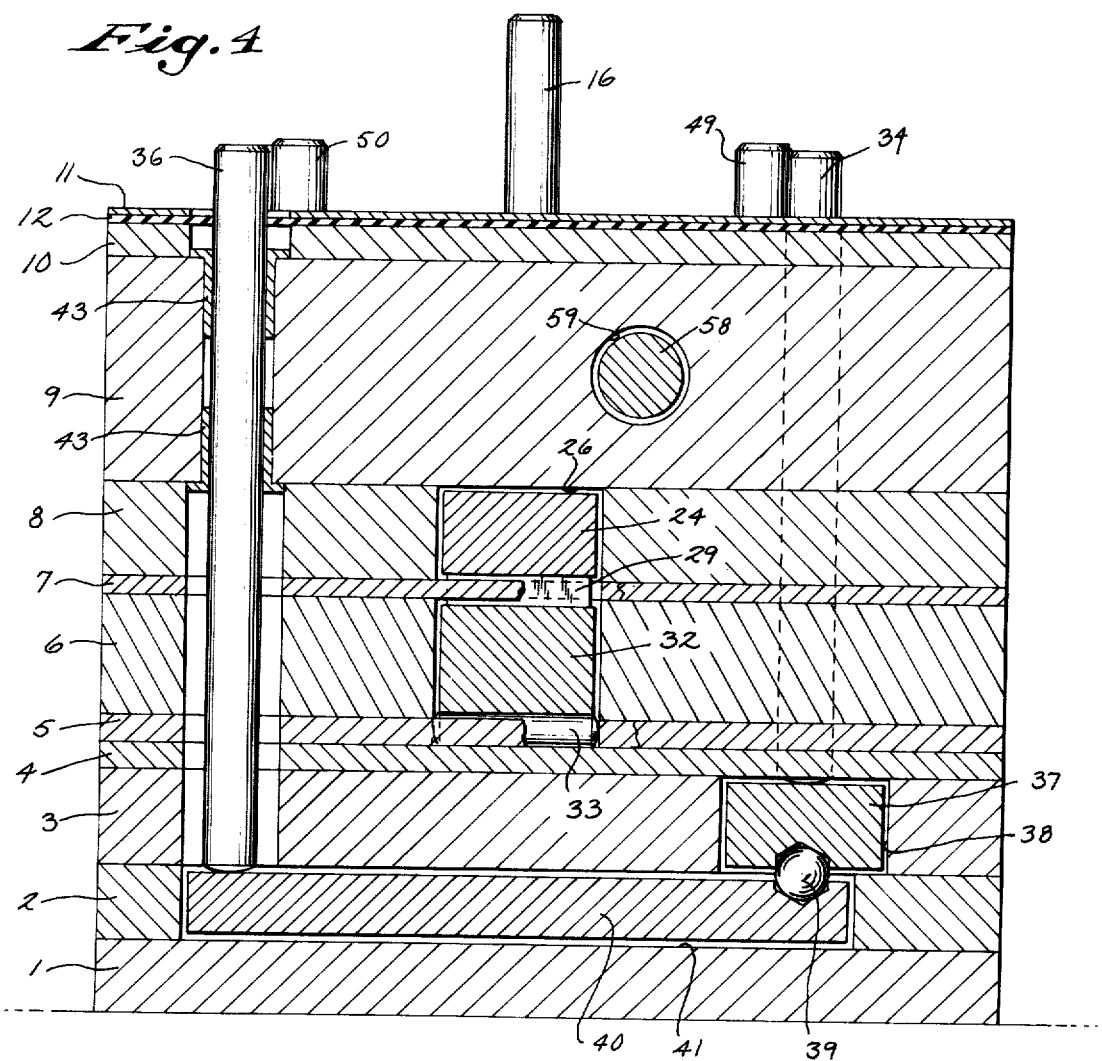
FIG. 4 is a section taken along line 4—4 of FIG. 2.

The third targeting pin 36 is mounted for sliding movement within aligned openings in plates 3–11 by bushings 43, and the lower end of the pin 36, as shown in FIG. 4, is engaged with a second corner of the triangular plate 40. The third corner of the triangular plate 40 carries an upstanding pin 44 and the lower end of a coil spring 45, which extends through aligned openings in the plates 3–9, surrounds the pin 44, as illustrated in FIG. 5. The upper end of the spring 45 is disposed around a pin 46 that extends downwardly from plate 10. With this construction the force of the spring 45 acts downwardly against the corner of the triangular plate 40.

The triangularly arranged targeting pins 34–36, in conjunction with the balance plates 37 and 40, act to level the casting 22 in a transverse direction.

A group of four spring loaded locking pins or jacks 47–50 project upwardly from the fixture and are adapted to be engaged by the lower surface of the head casting 22 as the casting is lowered onto the fixture. When the fixture is not supporting the casting 22, the pins 47–50 extend upwardly to a position slightly above the upper extremities of the targeting pins 34–36.

As best shown in FIG. 3, pins 47–50 are mounted for sliding movement within aligned openings in plates 9–11 by bushings 51 and 52 which are associated with plate 9.

The lower end of each pin 47–50 carries an extension 53 and a spring 54 surrounds the extension 53 and bears against a disc-like seat 55 on the bottom end of each pin. Springs 54 are located within aligned openings in plates 5–8, and the lower end of each spring is disposed around a pin 56 that extends upwardly from plate 4. The force of the springs 54 urges the pins 47–50 upwardly, and when the casting 22 is placed on the fixture, the weight of the casting will overcome the force of the spring 54 to thereby move the pins 47–50 downwardly within the fixture.

The pins 47–50 are adapted to be locked with respect to the fixture after the cylinder head casting 22 has been leveled on the fixture. The locking mechanism includes a handle 57 which is located on the exterior of the fixture and is connected to one end of a shaft 58 that extends horizontally through a passage 59 in plate 9. Shaft 58 is formed with eccentric sections 60 and 61 and plate 9 has a pair of lateral passages 62 and 63 which intersect the passage 59 at the location of the eccentric 60. Passage 62 communicates with the opening within which pin 48 is located, while the passage 63 communicates with the opening which receives the pin 47. In a similar manner, a pair of passages 64 and 65 intersect the passage 59 at the location of the eccentric 61. Passage 64 also communicates with the opening which receives the pin 49, while passage 65 communicates with the opening that receives the pin 50.

To provide a locking action, a pair of plugs 66 and 67 border each eccentric section 60 and 61. The plugs 66 are located at the inner ends of the passages 63 and 64, while the plugs 67 are disposed at the inner ends of the passages 62 and 65. Each plug 66 is provided with a generally curved side 68 which is in engagement with the respective eccentric section 60 and 61, and the opposite side of each plug 66 is formed with a groove 69. As best shown in FIG. 2, a spacer sleeve 70 surrounds each pin 47 and 49 and is located between the bushings 51 and 52. The sleeve 70 is provided with a ridge 71, which mates with the groove 69 in the plug 66. With this construction, rotation of the handle 57 will correspondingly rotate the eccentric sections 60 and 61, causing the plugs 66 to move outwardly against the sleeves 70 and the outward pressure of the sleeves against the pins 47 and 49 will bind the pins and prevent movement of the pins with respect to the fixture.

The plugs 67 are similar in construction to the plugs 66 and each plug 67 is provided with a generally curved side 72 which engages the respective eccentric sections 60 and 61. The opposite side of each plug 67 is formed with a groove 73, as shown in FIG. 3. To simultaneously lock or bind the pins 48 and 50, a pin 74 is located within each passage 62 and 65 and one end of each pin 74 is formed with a rib or ridge 75 which engages the groove 73 in the respective plug 67. The opposite end of each pin 74 bears against a spring 76, and the spring in turn is in engagement with a spacer sleeve 77 which surrounds the respective pins 48 and 50.

As the handle 57 is rotated, causing a corresponding rotation of the eccentric sections 60 and 61, the plugs 67 are moved outwardly within the passages 62 and 65 to thereby force the sleeves 77 outwardly against the pins 48 and 50 to bind the pins within the openings and thereby lock the pins with respect to the fixture.

Thus, the locking pins 47–50, when moved to the locked position will secure the casting 22 with respect to the fixture, so that the casting will not move relative to the fixture under the force of the grinding mechanism.

In operation, the cylinder head casting 22 is lifted by an overhead crane or other suitable lifting mechanism and lowered onto the fixture so that the aligning pins 14–19 are received within the cavities 21 and engage the surfaces 20. As the head casting 22 is lowered, the lower surface of the casting will engage the spring loaded locking pins 47–50 and move the locking pins downwardly against the force of the springs 54. In addition, the lower surface of the casting will engage the targeting pins 34–36. The aligning pins 14–19 will move according to the position of the surfaces 20 by virtue of the balancing plates 23–25, 30 and 32, to thereby level the casting in a longitudinal direction. Similarly, the targeting pins 34–36 will tend to level the casting in a transverse direction by virtue of the balancing bar 37 and triangular balancing plate 40.

With the casting balanced on the aligning pins 14–19 and targeting pins 34–36, the locking handle 57 is rotated, thereby rotating the eccentric sections 60 and 61 of shaft 58, to lock the pins 47–50. With the pins 47–50 locked against movement, the casting 22 will be firmly supported by the fixture so that the fixture can then be passed through the grinding machine.

The fixture is moved through the grinding machine by a hydraulic cylinder unit, not shown, and as the casting 22 passes through the grinding machine the upper surface, as well as the two longitudinal side surfaces of the casting, are ground to grind away parting lines, flash, flow pins, gating, etc. Following the grinding of the upper surface and the two longitudinal surfaces, the casting and fixture can be passed through a second grinding unit to grind the end surfaces of the casting, if desired.

While the above description has shown the fixture being used in supporting a cylinder head casting for an automatic grinding operation, it is contemplated that the fixture can be used to support various types of castings having internal cavities for different types of working operations.

Furthermore, the use of six aligning pins is not critical to the invention and any number of aligning pins can be used depending on the number of cavities in the casting. Similarly, in certain applications only one group of balancing plates, such as plates 23–25 may be used, while in other applications, superimposed groups of balancing plates or members may be preferred.

Various modes of carrying out the invention are contemplated as being within the scope of the following claims particularly pointing out and distinctly claiming the subject matter which is regarded as the invention.

We claim:

1. A fixture for supporting a workpiece during a working operation, said workpiece having a plurality of internal cavities with each cavity including a bottom surface and said bottom surfaces lying substantially along a common reference line, said fixture comprising a body, first leveling means for leveling the workpiece in a first direction, said first leveling means including a series of first axially movable pins extending upwardly beyond the body and disposed to be received within the respective cavities in the workpiece and engage the bottom surfaces, said first leveling means also includes a first balancing member fulcrumed with respect to the body, a pair of said first pins being engaged with the ends of said first balancing member on either side of the fulcrum, whereby axial movement of said first pins when the first pins engage said bottom surfaces can cause tilting of said first balancing member about said fulcrum, second leveling means for leveling the workpiece in a second direction generally normal to said first direction, said second leveling means including a series of second axially movable pins extending upwardly beyond said body and disposed to engage the lower surface of said workpiece, and locking means for locking the workpiece against movement with respect to the fixture after said first and second leveling means have leveled the workpiece in said first and second directions, respectively.

2. The fixture of claim 1, wherein the first leveling means includes two pair of first pins with each first pin being mounted for acial movement with respect to said body, and a pair of first balancing members each fulcrumed with respect to the body, the first pins of one pair being engaged with the ends of one of said first balancing members and the first pins of the second pair being engaged with the ends of the other of said first balancing members, whereby axial movement of said first pins when the first pins engage said bottom surfaces can cause tilting of the respective first balancing members about their fulcrums.

3. The fixture of claim 1, wherein the second leveling means includes three second pins disposed in triangular relationship.

4. The fixture of claim 2, and including a second balancing member fulcrumed with respect to the body, the first balancing members being fulcrumed on the respective ends of the second balancing member.

5. The fixture of claim 3, and including a balancing plate mounted for tilting movement with respect to said body, the lower ends of two of said second pins disposed in engagement with the respective ends of said balancing plate, a second balancing plate mounted for tilting movement with respect to said body, said first balancing plate being fulcrumed on said second balancing plate at a first location, a third of said second pins disposed in engagement with said second balancing plate at a second location, and biasing means acting downwardly against the second balancing plate at a third location, said first, second and third locations being disposed in triangular arrangement.

6. A fixture for supporting a casting during an automatic grinding operation, said casting having a plurality of internal cavities with each cavity including a bottom surface and said bottom surfaces lying substantially along a common reference line, said fixture comprising a body, a row of aligning pins extending upwardly beyond the upper surface of the body and disposed to be received within the cavities in the casting and engage the bottom surfaces, a plurality of first balancing members each fulcrumed with respect to the body, the lower ends of a pair of adjacent aligning pins disposed in engagement with the ends of one of said first balancing members on either side of its fulcrum, a series of support pins extending upwardly beyond the body and disposed to engage the lower surface of the casting, biasing means for biasing the support pins upwardly towards the casting, and locking means for locking the support pins with respect to the body.

7. The fixture of claim 6, and including a series of targeting pins extending upwardly from the upper surface of the body and disposed to engage the lower surface of the casting, and a second balancing member fulcrumed with respect to said body, two of the targeting pins acting against the second balancing member on opposite sides of its fulcrum.

8. The fixture of claim 7, wherein there are three targeting pins arranged in a generally triangular pattern.

9. The fixture of claim 6, wherein said support pins are mounted for axial sliding movement with respect to the body, and said locking means comprises a locking member to lock said support means against sliding axial movement.

10. The fixture of claim 9, wherein said locking member comprises a sleeve disposed around each support pin and said locking means includes an eccentric operable to bind each sleeve against the respective support pin to lock the pin against sliding movement.

11. The fixture of claim 10, wherein said locking means also includes an operating member located on the outside of said body and operably connected to said eccentric for operating said eccentric.

12. The fixture of claim 6, wherein each adjacent pair of first balancing members are fulcrumed on a second balance member, said second balancing member being fulcrumed for tilting movement with respect to said body.

13. The fixture of claim 7, wherein the fixture include three targeting pins arranged in a generally triangular pattern, two of said targeting pins being in engagement with the ends of the second balancing member, a balancing plate mounted for rocking movement with respect to the body, said second balancing member being fulcrummed at a first location on said balancing plate, a third of said targeting pins bearing against a second location on said balancing plate, and biasing means acting downwardly against a third location on said balancing plate, said first, second and third locations being arranged in a triangular pattern.

14. A fixture for supporting a workpiece during a working operation, said workpiece having a plurality of internal cavities with each cavity including a bottom surface and said bottom surfaces lying substantially along a common reference line, said fixture comprising a body; first leveling means for leveling the workpiece in a first direction, said first leveling means including a series of first axially movable pins extending upwardly beyond the body and disposed to be received within the respective cavities in the workpiece and engage the bottom surfaces; second leveling means for leveling the workpiece in a second direction generally normal to said first direction, said second leveling means including a series of second axially movable pins extending upwardly beyond said body and disposed to engage the lower surface of said workpiece; and locking means for locking the workpiece against movement with respect to the fixture after said first and second leveling means have leveled the workpiece in said first and second directions, respectively, said locking means comprises a series of locking pins mounted for axial movement with respect to the body, the upper ends of said locking pins projecting beyond the body and disposed to engage the lower surface of the workpiece, biasing means for biasing the pins upwardly, and a locking member to lock each locking pin with respect to the body.

15. The fixture of claim 14, wherein the locking pins project upwardly beyond said second pins.

* * * * *

UNITED STATES PATENT AND TRADEMARK OFFICE
CERTIFICATE OF CORRECTION

PATENT NO. : 3,935,679
DATED : February 3, 1976.
INVENTOR(S) : BRUNO E. PETER and REINHARDT R. DEETKEN It is certified that error appears in the above-identified patent and that said Letters Patent are hereby corrected as shown below:

Column 1, line 13, Cancel "gring" and substitute therefor ---grind---, Column 1, line 24, Cancel "vaaious" and substitute therefor ---various---, Column 6, line 33 (Claim 2), Cancel "acial" and substitute therefor ---axial---.

Signed and Sealed this

Seventh Day of September 1976

[SEAL]

Attest:

RUTH C. MASON
Attesting Officer

C. MARSHALL DANN
Commissioner of Patents and Trademarks